US009867193B2

(12) United States Patent
Nogami et al.

(10) Patent No.: US 9,867,193 B2
(45) Date of Patent: *Jan. 9, 2018

(54) TRANSMISSION DEVICE, RECEPTION DEVICE, COMMUNICATION SYSTEM, AND COMMUNICATION METHOD

(71) Applicant: Sharp Kabushiki Kaisha, Sakai, Osaka (JP)

(72) Inventors: Toshizo Nogami, Osaka (JP); Kazuyuki Shimezawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,433

(22) Filed: Dec. 9, 2016

(65) Prior Publication Data

US 2017/0094667 A1    Mar. 30, 2017

Related U.S. Application Data

(63) Continuation of application No. 14/339,145, filed on Jul. 23, 2014, now Pat. No. 9,531,456, which is a
(Continued)

(30) Foreign Application Priority Data

Jan. 22, 2010    (JP) .................................. 2010-011868

(51) Int. Cl.
*H04W 72/04* (2009.01)
*H04B 7/0452* (2017.01)
(Continued)

(52) U.S. Cl.
CPC ...... *H04W 72/0466* (2013.01); *H04B 7/0452* (2013.01); *H04B 7/0665* (2013.01);
(Continued)

(58) Field of Classification Search
CPC ........... H04W 72/0466; H04W 72/042; H04W 88/08; H04L 5/0007; H04L 5/0048;
(Continued)

(56) References Cited

U.S. PATENT DOCUMENTS

2009/0046805 A1    2/2009  Kim et al.
2010/0172424 A1*   7/2010  Perets .................. H04L 1/0656
                                                           375/260
(Continued)

FOREIGN PATENT DOCUMENTS

JP         2009-212615 A      9/2009
WO    WO 2009/023850 A1      2/2009

OTHER PUBLICATIONS

"3rd Generation Partnership Project; Technical Specification Group Radio Access Network; Evolved Universal Terrestrial Radio Access (E-UTRA); Physical layer procedures (Release 8)," 3GPP TS 36.213, V8.8.0, Sep. 2009, pp. 1-77.
(Continued)

*Primary Examiner* — Syed Haider
(74) *Attorney, Agent, or Firm* — Birch, Stewart, Kolasch & Birch, LLP

(57) ABSTRACT

A transmission device that generates control information including 3-bit information and transmits a physical downlink shared channel, a reference signal for demodulation of the physical downlink shared channel, and the control information, wherein, in a case that all codewords which are mapped to the physical downlink shared channel are enabled, among a first value to an eighth value indicated by the 3-bit information, the third value to the eighth value indicate that the number of layers is from 3 to 8 respectively, and the first value and the second value indicate that the number of layers is equal to 2, and the first value indicates that the scrambling identity for the reference signal is equal
(Continued)

to 0 and the second value indicates that the scrambling identity is equal to 1.

4 Claims, 17 Drawing Sheets

Related U.S. Application Data continuation of application No. 13/574,516, filed as application No. PCT/JP2011/050642 on Jan. 17, 2011, now Pat. No. 8,995,550.

(51) Int. Cl.
*H04B 7/06* (2006.01)
*H04J 13/00* (2011.01)
*H04L 5/00* (2006.01)
*H04W 88/08* (2009.01)

(52) U.S. Cl.
CPC ........ *H04J 13/0003* (2013.01); *H04L 5/0048* (2013.01); *H04W 72/042* (2013.01); *H04B 7/0689* (2013.01); *H04L 5/0007* (2013.01); *H04W 88/08* (2013.01)

(58) Field of Classification Search
CPC .. H04B 7/0689; H04B 7/0452; H04B 7/0665; H04J 13/0003
See application file for complete search history.

(56) References Cited

U.S. PATENT DOCUMENTS

| | | | | |
|---|---|---|---|---|
| 2010/0303034 | A1* | 12/2010 | Chen | H04L 5/0023 370/329 |
| 2010/0323709 | A1* | 12/2010 | Nam | H04L 5/0094 455/450 |
| 2011/0274205 | A1* | 11/2011 | Lee, II | H04B 7/0413 375/295 |
| 2012/0033630 | A1 | 2/2012 | Chung et al. | |
| 2012/0114021 | A1* | 5/2012 | Chung | H04B 7/155 375/211 |
| 2012/0132338 | A1 | 5/2012 | Horiuchi | |
| 2012/0134338 | A1 | 5/2012 | Ko et al. | |
| 2012/0201187 | A1 | 8/2012 | Koo et al. | |
| 2012/0218882 | A1 | 8/2012 | Ko et al. | |
| 2012/0243497 | A1 | 9/2012 | Chung et al. | |
| 2012/0250655 | A1 | 10/2012 | Noh et al. | |
| 2012/0257531 | A1* | 10/2012 | Ko | H04B 7/0417 370/252 |

OTHER PUBLICATIONS

"3rd Generation Partnership Project; Technical Specification Group Radio Access Network; Further Advancements for E-UTRA Physical Layer Aspects (Release 9)," 3GPP TR 36.814, V1.5.2, Dec. 2009, pp. 1-77.
"DL RS Designs for LTE-Advanced," 3GPP TSG RAN WG1 #56bis R1-091231, Samsung, Mar. 23-27, 2009.
"UE-specific reference symbol multiplexing for LTE-Advanced downlink," 3GPP TSG RAN WG1 Meeting #58 R1-093303, Nokia, Nokia Siemens Networks, Aug. 24-28, 2009.
"Way forward on DMRS sequence generation for dual layer SM," 3GP TSG-RAN WG1 #58bis R1-094408, Oct. 13, 2009.
"Way forward on the details of DCI format 2B for enhanced DL transmission," 3GPP TSG-RAN WG1 #58bis R1-094413, Oct. 12-16, 2009.
International Search Report issued PCT/JP2011/050642, dated Feb. 8, 2011.
NEC Group, "Downlink Control Signalling Support for SU/MU-MIMO", 3GPP TSG-RAN WG1 Meeting #59, Jeju, Korea, Nov. 9-13, 2009, R1-094730, 7 pages.
U.S. Ex Parte Quayle Action issued in U.S. Appl. No. 13/574,516 on Mar. 27, 2014.
U.S. Notice of Allowance issued in U.S. Appl. No. 14/339,145 dated Nov. 17, 2016.
U.S. Office Action issued in U.S. Appl. No. 14/339,145 dated Apr. 19, 2016.
U.S. Office Action issued in U.S. Appl. No. 14/339,145 dated Nov. 3, 2015.

* cited by examiner

FIG.9

| RANK INFORMATION | | 3 BITS |
|---|---|---|
| CW1 | MCSI | 5 BITS |
| | NDI | 1 BIT |
| | RV | 2 BITS |
| CW2 | MCSI | 5 BITS |
| | NDI | 1 BIT |
| | RV | 2 BITS |

FIG.10

| RANK INFORMATION | | 1 | 1 | 1 | 2 | 2 | 2 | 3 | 4 | 5 | 6 | 7 | 8 |
|---|---|---|---|---|---|---|---|---|---|---|---|---|---|
| CW1 | MCS / RV | enable | enable | enable | enable | enable | enable | — | — | — | — | — | — |
| | NDI | — | — | — | — | — | — | — | — | — | — | — | — |
| CW2 | MCS / RV | disable | disable | enable | disable | disable | enable | — | — | — | — | — | — |
| | NDI | 0 | 1 | — | 0 | 1 | — | — | — | — | — | — | — |
| PORT | | PORT 7 | PORT 8 | PORT 7 AND PORT 8 | PORT 9 | PORT 10 | PORT 9 AND PORT 10 | PORT 7-9 | PORT 7-10 | PORT 7-11 | PORT 7-12 | PORT 7-13 | PORT 7-14 |

FIG.11

| RANK INFORMATION | | 1 | 1 | 1 | 2 | 2 | 2 | 3 | 4 | 5 | 6 | 7 | 8 |
|---|---|---|---|---|---|---|---|---|---|---|---|---|---|
| CW1 | MCS / RV | enable | enable | enable | enable | enable | enable | – | – | – | – | – | – |
| | NDI | – | – | – | – | – | – | – | – | – | – | – | – |
| CW2 | MCS / RV | disable | disable | enable | disable | disable | enable | – | – | – | – | – | – |
| | NDI | 0 | 1 | – | 0 | 1 | – | – | – | – | – | – | – |
| PORT | | PORT 7 | PORT 8 | PORT 7 AND PORT 8 | PORT 7 | PORT 8 | PORT 7 AND PORT 8 | PORT 7-9 | PORT 7-10 | PORT 7-11 | PORT 7-12 | PORT 7-13 | PORT 7-14 |
| SEQUENCE | | 0 | 0 | 0 | 1 | 1 | 1 | – | – | – | – | – | – |

FIG.12

| RANK INFORMATION | | 2 BITS |
|---|---|---|
| CW1 | MCSI | 5 BITS |
| | NDI | 1 BIT |
| | RV | 2 BITS |
| CW2 | MCSI | 5 BITS |
| | NDI | 1 BIT |
| | RV | 2 BITS |

FIG.13

| RANK INFORMATION | | 1 | 1 | 1 | 2 | 2 | 2 | 3 | 4 |
|---|---|---|---|---|---|---|---|---|---|
| CW1 | MCS / RV | enable | enable | enable | enable | enable | enable | – | – |
| | NDI | – | – | – | – | – | – | – | – |
| CW2 | MCS / RV | disable | disable | enable | disable | disable | enable | – | – |
| | NDI | 0 | 1 | – | 0 | 1 | – | – | – |
| PORT | | PORT 7 | PORT 8 | PORT 7 AND PORT 8 | PORT 9 | PORT 10 | PORT 9 AND PORT 10 | PORT 7-9 | PORT 7-10 |

FIG.14

| RANK INFORMATION | | 1 | 1 | 1 | 2 | 2 | 2 | 3 | 4 |
|---|---|---|---|---|---|---|---|---|---|
| CW1 | MCS / RV | enable | enable | enable | enable | enable | enable | -- | -- |
| | NDI | -- | -- | -- | -- | -- | -- | -- | -- |
| CW2 | MCS / RV | disable | disable | enable | disable | disable | enable | -- | -- |
| | NDI | 0 | 1 | -- | 0 | 1 | -- | -- | -- |
| PORT | | PORT 7 | PORT 8 | PORT 7 AND PORT 8 | PORT 7 | PORT 8 | PORT 7 AND PORT 8 | PORT 7-9 | PORT 7-10 |
| SEQUENCE | | 0 | 0 | 0 | 1 | 1 | 1 | -- | -- |

FIG.19　　　　　　　　　　PRIOR ART
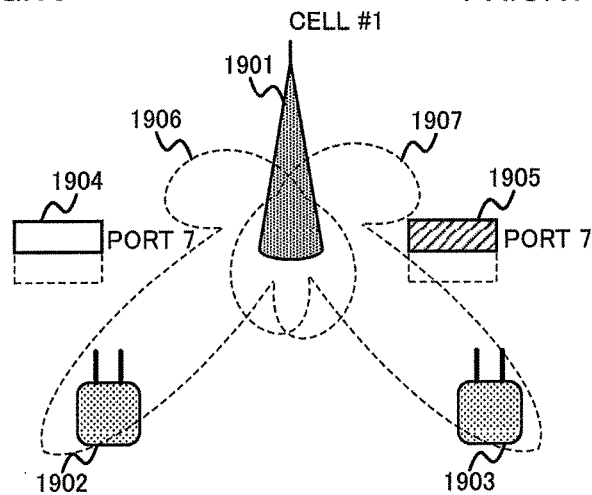
FIG.20　　　　　　　　　　PRIOR ART
| | | |
|---|---|---|
| CW1 | MCSI | 5 BITS |
| | NDI | 1 BIT |
| | RV | 2 BITS |
| CW2 | MCSI | 5 BITS |
| | NDI | 1 BIT |
| | RV | 2 BITS |
| SCID | | 1 BIT |

TRANSMISSION DEVICE, RECEPTION DEVICE, COMMUNICATION SYSTEM, AND COMMUNICATION METHOD

This application is a Continuation of copending application Ser. No. 14/339,145, filed on Jul. 23, 2014, which is a continuation of application Ser. No. 13/574,516, filed on Jul. 20, 2012, now U.S. Pat. No. 8,995,550 B2, which is the National Phase of PCT International Application No. PCT/JP2011/050642 filed on Jan. 17, 2011, which claims the benefit under 35 U.S.C. §119(a) to Patent Application No. 2010-011868, filed in Japan on Jan. 22, 2010, all of which are hereby expressly incorporated by reference into the present application.

TECHNICAL FIELD

The present invention relates to a transmission device, a reception device, a communication system, and a communication method.

BACKGROUND ART

There are known mobile radio communication systems such as WCDMA (Wideband Code Division Multiple Access), LTE (Long Term Evolution), LTE-A (LTE-Advanced, and WiMAX (Worldwide Interoperability for Microwave Access) by 3GPP (Third Generation Partnership Project). These mobile radio communication systems can increase the communication area by a cellular configuration in which the area covered by a base station (a base station device, a transmission station, a transmission device, eNodeB) or a transmission station conforming to the base station is arranged as a plurality of cells.

The aforementioned mobile radio communication system can realize a more efficient data transmission by adaptively controlling the modulation and coding scheme (MCS), the number of spatial multiplex (layers, rank), precoding weight (precoding matrix) and the like according to the communication path status between abase station and a terminal device. NPL 1 net forth below discloses a method of such control.

FIG. 17 represents an example of a SU (Single User)-MIMO (Multiple Input Multiple Output, spatial multiplex transmission) in a transmission mode using the dual layer beam forming scheme of LTE. A base station 1701 transmits two transmission data addressed to a terminal device 1702, i.e. transmission data 1703 and transmission data 1704, using two ports (logic ports) that are spatial-multiplex for a terminal device 1702, i.e. a port 7 and a port 8. A reference signal of port 7 and a reference signal of port 8 are multiplied by spread codes orthogonal to each other. Accordingly, terminal device 1702 can readily have the reference signal of port 7 and the reference signal of port 8 separated.

FIG. 18 represents an example of downlink multiple user (MU)-MIMO in a transmission mode using a dual layer beam forming scheme of LTE. A base station 1801 uses port 7 and port 8 that are two spatial-multiplexed ports, as disclosed in NPL 2 set forth below, to transmit transmission data 1804 addressed to a terminal device 1802 and transmission data 1805 addressed to a terminal device 1803 at the same time and using the same frequency towards terminal devices 1802 and 1803. The reference signal of port 7 and the reference signal of port 8 are multiplied by spread codes orthogonal to each other. The terminal device is configured to identify in which port its own addressed transmission data is included by using downlink control information. Terminal device 1802 and terminal device 1803 can readily separate the reference signal of port 7 and the reference signal of port 8. Furthermore, terminal device 1802 and terminal device 1803 can extract the transmission data by demodulating the received data using a reference signal corresponding to its own addressed port.

FIG. 19 represents another example of downlink MU-MIMO transmission in a transmission mode using a dual layer beam forming scheme of LTE. A base station 1901 uses port 7 that is one of the two ports that are spatial-multiplexed for a terminal device 1902 and a terminal device 1903 to transmit transmission data 1904 addressed to terminal device 1902 and transmission data 1905 addressed to terminal device 1903 at the same time and using the same frequency. Although base station 1901 sends transmission data 1904 and transmission data 1905 through the same port 7, the directivity of the signals for sending respective transmission data can be set independently. Specifically, base station 1901 sends transmission data 1904 in a first directivity 1906 and transmission data 1905 in a second directivity 1907. The reference signal for terminal device 1902 and the reference signal for terminal device 1903 are multiplied by scrambling codes quasi-orthogonal to each other. Base station 1901 notifies terminal device 1902 and terminal device 1903 about information indicating respective scrambling codes through downlink control information. Accordingly, terminal device 1902 and terminal device 1903 can separate the reference signal of its own port 7 using the difference in directivity and difference in the scrambling code.

FIG. 20 represents a part of downlink control information in LTE. A code word (CW) is a group of transmission data. The control information includes, in addition to the 16 bits of information related to CW1 and CW2 that are code words, a 1-bit scrambling code identification (SCID) indicating the type of scrambling code, as disclosed in NPL 3 set forth below. For each CW, a MCS (modulation and coding scheme) indicator (MCSI) indicating the MCS is represented in 5 bits, a new data indicator (NDI) indicating whether the transmission is the initial delivery or not is represented in 1 bit, and the redundancy version (RV) indicating the puncturing pattern is represented in 2 bits.

In LTE, the CW addressed to four terminal devices at most can be transmitted by MU-MIMO relative to the two ports shown in FIG. 18 by multiplying the two scrambling codes according to the 1-bit SCID shown in FIG. 20 by each port, as shown in FIG. 19.

In LTE-A that is an extended version of LTE, there is proposed increasing the highest multiplex value of SU-MIMO to 8 while keeping the backward compatibility to LTE, as described in NPL 4 set forth below.

CITATION LIST

Non Patent Literatures

NPL 1: 3rd Generation Partnership Project (3GPP); Technical Specification Group (TSG) Radio Access Network (RAN); Evolved Universal Terrestrial Radio Access (E-UTRA); Physical Layer Procedures (Release 8), December 2008, 3GPP TS 36.213 V8.8.0 (2009-September)

NPL 2: 3GPP TSG-RAN WG1 #58bis R1-094413, "Way forward on the details of DCI format 213 for enhanced DL transmission", October 2009

NPL 3: 3GPP TSG-RAN WGl #58bis R1-094408, "Way forward on DMRS sequence generation for dual layer SM", October 2009

NPL 4: 3GPP TR 36.814 "Further Advancements for E-UTRA Physical Layer Aspects", December 2009

SUMMARY OF INVENTION

Technical Problem

The signaling in a conventional system cannot accommodate more ports than the number of ports expected in the conventional system. It was difficult to extend the ports, impeding improvement in the transmission efficiency.

In view of the foregoing, an object of the present invention is to provide a transmission device, a reception device, a communication system and a communication method that can realize high transmission efficiency by allowing extension to more ports than the conventional number of ports through efficient signaling.

Solution to Problem (1) An aspect of the present invention is directed to a transmission device in a communication system in which a highest rank that is the number of spatial multiplex is 8. The transmission device includes a control information generation unit generating control information including 3-bit rank information indicating the rank of transmission data, and a transmission unit transmitting the transmission data, a reference signal that is a signal for demodulating a physical downlink shared channel having the transmission data mapped, and the control information.

(2) Preferably, among a first state to an eighth state represented by the 3-bit rank information, the third state to eighth state indicate that the rank is from 3 to 8, respectively, and the first state and second state indicate that the rank is less than or equal to 1 The first state indicates that a sequence by which the reference signal is multiplied is the first sequence, and the second state indicates that a sequence by which the reference signal is multiplied is the second sequence.

(3) Another aspect of the present invention is directed to a reception device in a communication system in which a highest rank that is the number of spatial multiplex is 8. The reception device includes a reception unit receiving transmission data, a reference signal that is a signal for demodulating a physical downlink shared channel having the transmission data mapped, and control information including 3-bit rank information indicating the rank of the transmission data, and an identification unit identifying a reference signal using the control information.

(4) Preferably, among a first state to an eighth state represented by the 3-bit rank information, the third state to eighth state indicate that the rank is from 3 to 8, respectively, and the first state and second state indicate that the rank is less than or equal to 2. The first state indicates that a sequence by which the reference signal is multiplied is the first sequence, and the second state indicates that a sequence by which the reference signal is multiplied is the second sequence.

(5) Still another aspect of the present invention is directed to a communication system in which a highest rank that is the number of spatial multiplex of transmission data transmitted from a transmission device to a reception device is 8. The transmission device includes a control information generation unit generating control information including 3-bit rank information indicating the rank of transmission data, and a transmission unit transmitting transmission data, a reference signal that is a signal for demodulating a physical downlink shared channel having transmission data mapped, and control information. The reception device includes a reception unit receiving transmission data, a reference signal, and control information, and an identification unit identifying the reference signal using control information.

(6) Preferably, among a first state to an eighth state represented by the 3-bit rank information, the third state to eighth state indicate that the rank is from 3 to 8, respectively, and the first state and second state indicate that the rank is less than or equal to 2. The first state indicates that the sequence by which the reference signal is multiplied is the first sequence, and the second state indicates that the sequence by which the reference signal is multiplied is the second sequence.

(7) A still further aspect of the present invention is directed to a communication method used at a transmission device in a communication system in which a highest rank that is the number of spatial multiplex is 8. The communication method includes the steps of: the transmission device generating control information including 3-bit rank information indicating the rank of transmission data, and transmitting the transmission data, a reference signal that is a signal for demodulating a physical downlink shared channel having the transmission data mapped, and the control information.

(8) Preferably, among a first state to an eighth state represented by the 3-bit rank information, the third state to eighth state indicate that the rank is from 3 to 8, respectively, and the first state and second state indicate that the rank is less than or equal to 2. The first state indicates that the sequence by which the reference signal is multiplied is the first sequence, and the second state indicates that the sequence by which the reference signal is multiplied is the second sequence.

(9) A still further aspect of the present invention is directed to a communication method used at a reception device in a communication system in which a highest rank that is the number of spatial multiplex is 8. The communication method includes the steps of: the reception device receiving transmission data, a reference signal that is a signal for demodulating a physical downlink shared channel having transmission data mapped, and control information including 3-bit rank information indicating the rank of transmission data, and identifying the reference signal using the control information.

(10) Preferably, among a first state to an eighth state represented by the 3-bit rank information, the third state to eighth state indicate that the rank is from 3 to 8, respectively, and the first state and second state indicate that the rank is less than or equal to 2. The first state indicates that the sequence by which the reference signal is multiplied is the first sequence, and the second state indicates that the sequence by which the reference signal is multiplied is the second sequence.

Advantageous Effects of Invention

According to the present invention, high transmission efficiency can be realized by allowing extension to more ports than the conventional number of ports through efficient signaling.

BRIEF DESCRIPTION OF DRAWINGS

FIG. 9 represents a correspondence table of control information and the number of bits in the first embodiment.

FIG. 10 represents a correspondence table of control information and ports in the first embodiment.

FIG. 11 represents a correspondence table of control information with ports and sequences according to a second embodiment of the present invention.

FIG. 12 represents a correspondence table of control information and the number of bits according to a third embodiment of the present invention.

FIG. 13 represents a correspondence table of control information and ports in the third embodiment.

FIG. 14 represents a correspondence table of control information with ports and sequences according to the third embodiment.

FIG. 19 represents a configuration of a communication system carrying out MU-MIMO communication.

FIG. 20 represents a correspondence table of control information with the number of bits in a communication system carrying out MIMO communication.

DESCRIPTION OF EMBODIMENTS

Figure 1:
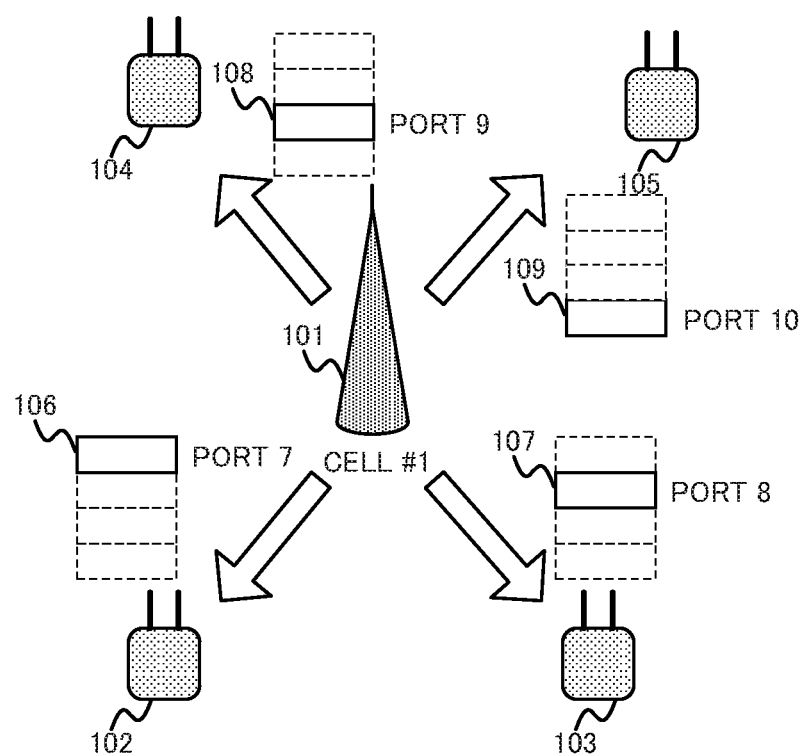
FIG. 1 is a schematic view of a configuration of a communication system according to a first embodiment of the present invention.

Each of the embodiments of the present invention will be described hereinafter with reference to the drawings. In the description set forth below, the same elements have the same reference characters allotted. Their designation and function are also the same, Therefore, detailed description thereof will not be repeated.

[First Embodiment]

A first embodiment of the present invention will be described hereinafter with reference to the drawings.

FIG. 1 is a schematic diagram representing a configuration of a communication system according to the first embodiment of the present invention. The communication system in FIG. 1 includes a base station 101 (a transmission device, base station device, eNodeB, eNB, cell, uplink reception device) constituting a cell #1, and terminal devices 102, 103, 104 and 105 (a reception device, UE, uplink transmission device). Base station 101 transmits CWs 106, 107, 108 and 109 that are transmission data for terminal devices 102, 103, 104 and 105, respectively, through MU-MIMO spatial multiplexing. The port for MU-MIMO corresponds to four ports from port 7 to port 10. Therefore, base station 101 can apply MU-MIMO multiplexing to the CW addressed to four terminal devices at most. The first embodiment corresponds to the case where CWs 106, 107, 108 and 109 are transmitted using ports 7, 8, 9 and 10, respectively. Base station 101 transmits to each terminal device the control information to identify the port used for transmitting the CW addressed to the relevant terminal device.

Figure 2:
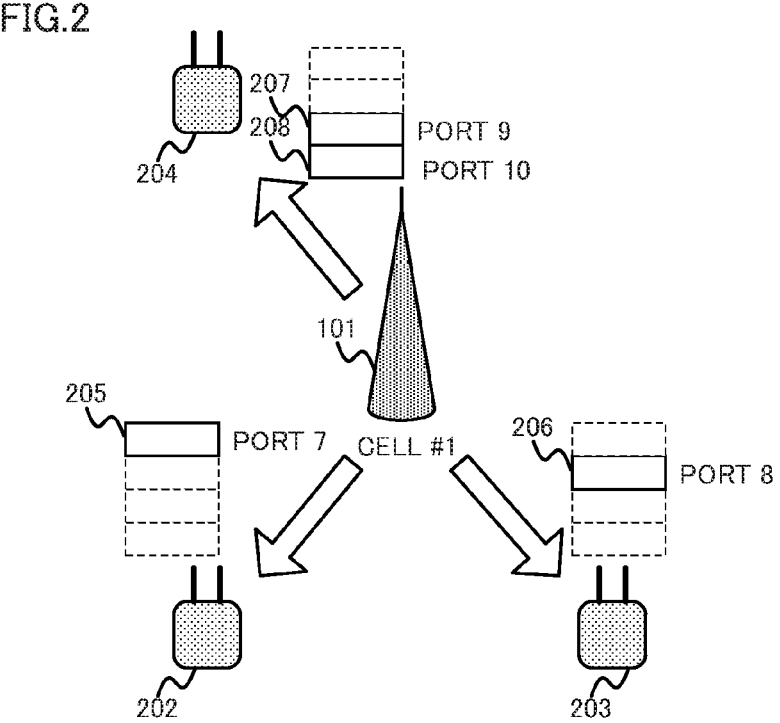
FIG. 2 is a schematic view of a configuration of a communication system according to the first embodiment.

FIG. 2 represents the case where base station 101 applies MU-MIMO multiplexing to the CWs addressed to the three terminal devices of 202, 203 and 204 for transmission. Base station 101 transmits CW 205 and CW 206 addressed to terminal devices 202 and 203, respectively, using ports 7 and 8, respectively. Base station 101 further applies SU-MIMO to the two CWs addressed to terminal device 204 for transmission. Base station 101 transmits CWs 207 and 208 that are transmission data addressed to terminal device 204 using ports 9 and 10 identical to the ports for MU-MIMO in FIG. 1. Base station 101 transmits to each terminal device the control information for identifying the port used for transmitting the CW addressed to the relevant terminal device.

Figure 3:
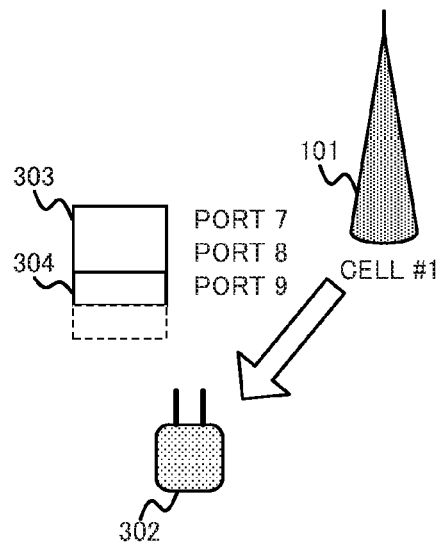
FIG. 3 is a schematic view of a configuration of a communication system according to the first embodiment.

FIG. 3 represents the case where base station 101 applies SU-MIMO multiplexing to the CW addressed to one terminal device 302. Base station 101 transmits CWs 303 and 304 addressed to terminal device 302 using port 7 and ports 8 and 9, respectively. Base station 101 transmits to terminal device 302 the control information for identifying the port used for transmitting the CW addressed to that terminal device.

Figure 4:
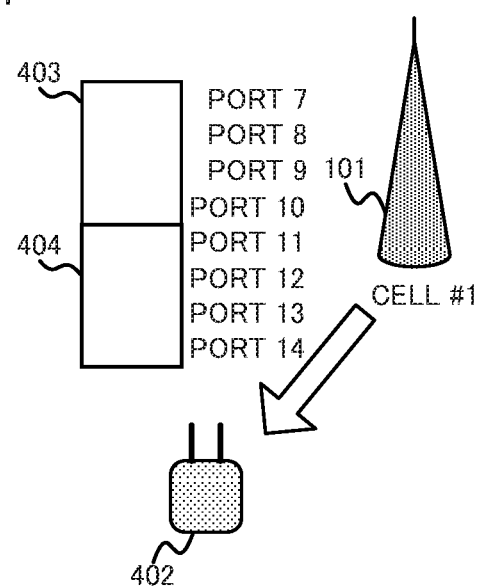
FIG. 4 is a schematic view of a configuration of a communication system according to the first embodiment.

FIG. 4 represents the case where base station 101 applies SU-MIMO multiplexing to the CW addressed to one terminal device 402 for transmission. Base station 101 transmits CW 403 addressed to terminal device 402 using ports 7-10, and CW 404 addressed to terminal device 402 using ports 11-14. Base station 101 transmits to terminal device 402 the control information for identifying the port used for transmission of the CW addressed to that terminal device.

Ports 7-10 are shared between SU-MIMO and MU-MIMO. Accordingly, the mutual information related to ports between the base station and terminal device (agreement made in advance) can be simplified. This mutual information will be described in detail afterwards.

Figure 5:
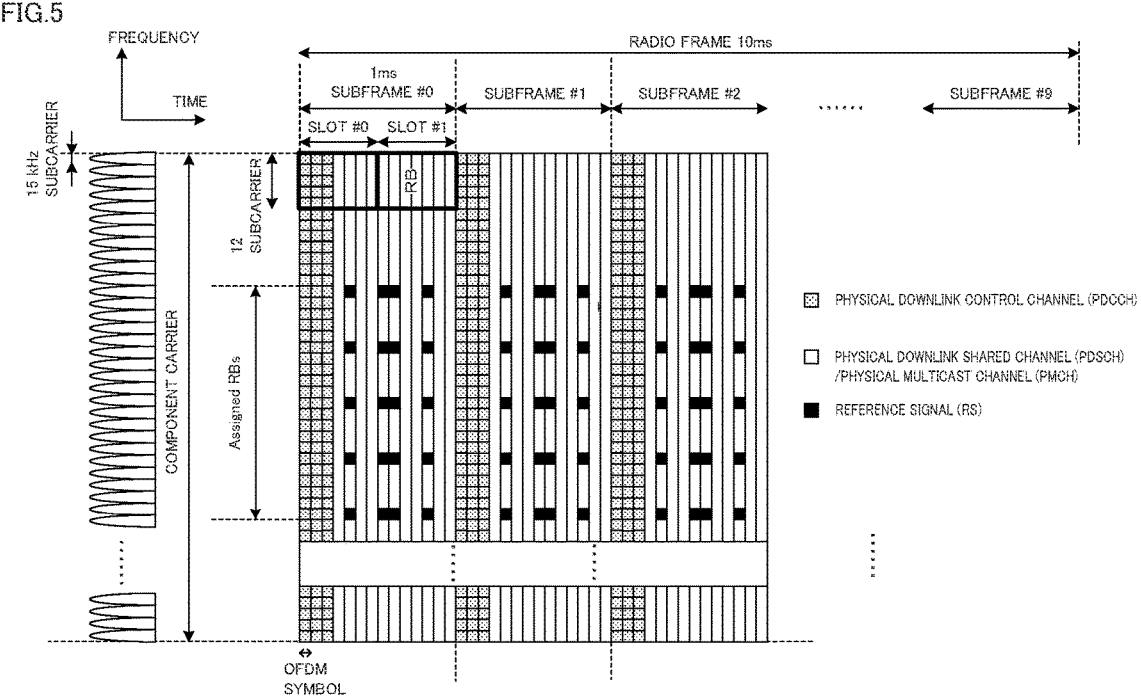
FIG. 5 represents an example of a radio frame configuration in the first embodiment.

FIG. 5 schematically represents a downlink radio frame configuration in the present embodiment. In FIG. 5, the time and frequency are plotted along the horizontal axis and vertical axis, respectively. In the time axis, a radio frame is 10 ms, One radio frame includes 10 subframes. Each subframe includes two slots. Each slot includes seven orthogonal frequency division multiplex (OFDM) symbols. On the frequency axis, multiple subcarriers are arranged at the interval of 15 kHz, A unit including 1 slot in the direction of the time axis and 12 subcarriers in the direction of the frequency axis constitutes a resource block (RB). This RB is the allocation unit of transmission data. In the case of SU-MIMO, a plurality of CWs are spatial multiplexed and allocated using a plurality of ports to one or multiple RBs. In the case of MU-MIMO, CW addressed to a plurality of terminal devices are spatial multiplexed and allocated using a plurality of ports to one or multiple RBs. Each subframe includes a physical downlink control channel that is a region where downlink control information is mapped, a physical downlink shared channel PDSCH for mapping downlink transmission data, and a RS (reference signal, demodulation reference signal (DM-RS), UE reference signal (UE-RS) that is a reference signal for demodulation of PDSCH.

RS is a reference signal unique to a terminal device. RS is subjected to precoding similar to that of PDSCH to which transmission data addressed to that terminal device is allocated. RS is inserted into an RB allocated to the transmission data addressed to that terminal device, RS is used for MIMO separation and demodulation of PDSCH. RS is set individually for each port. RS is inserted so as to be orthogonal to each other between ports. When the number of ports used differs between RBs, the inserted number of RSs also differs. For the multiplexing method of RS between ports, time division multiplexing (TDM) mapping to independent OFDM symbols, frequency-division multiplexing (FDM) mapping to independent subcarriers, and code division multiplexing (CDM) multiplying an independent spread code may be employed. Alternatively, such multiplexing method may be used in combination.

Figure 6:
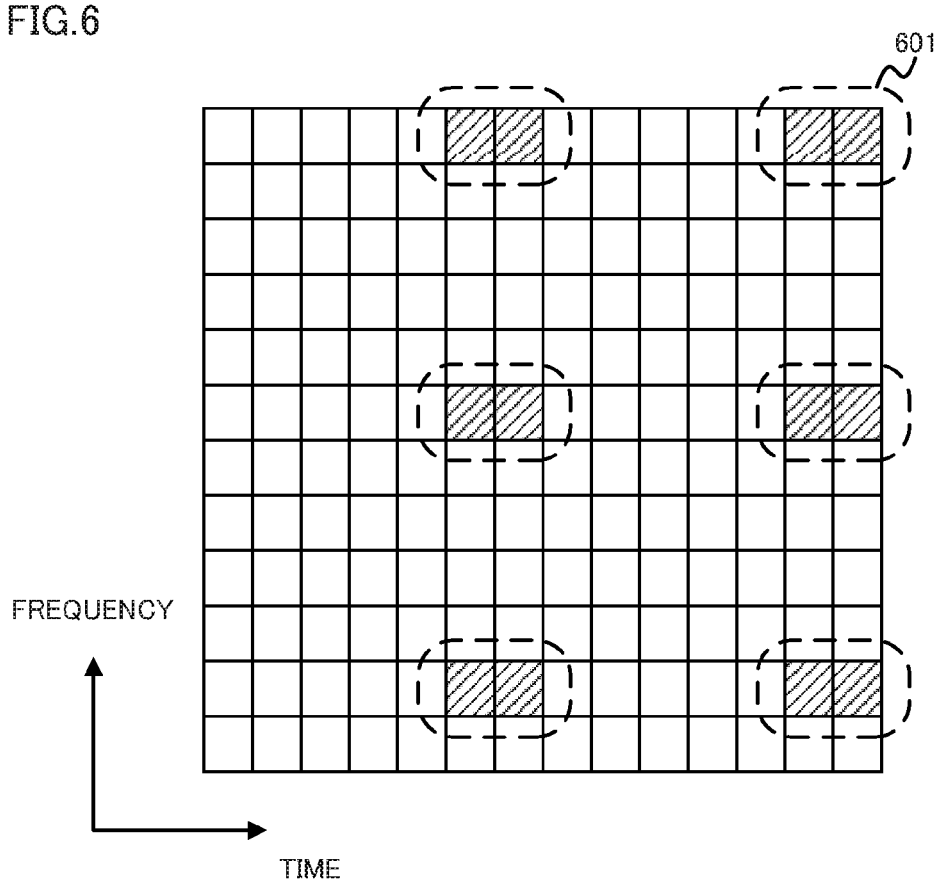
FIG. 6 represents an example of a resource block configuration in the first embodiment.

The case where FDM and CDM are used together as the multiplexing method of RS between ports will be described hereinafter. FIG. 6 represents the details of two RBs aligned on the time axis in FIG. 5. As mentioned above, 7 OFDM symbols on the time axis and 12 subcarriers on the frequency axis constitute one RB. One RB includes 84 resource elements (RE), each being a region constituted of 1 OFDM symbol and 1 subcarrier. FIG. 6 represents the RS arrangement when there is one port (port 7) or two ports (port 7 and port 8). The 12 REs identified by the hatched regions in FIG. 6 are the REs where RS is mapped. hi the case of one port, base station 101 maps the sequence for port 7 to the 12 REs identified by the hatched regions. When there are two ports, base station 101 maps the independent sequences for port 7 and port 8 to the 12 REs identified by the hatched regions. The independent sequences for port 7 and port 8 are configured to be multiplexed by CDM with a spreading factor of 2 between two adjacent REs 601 in which RS is mapped, and demultiplexed at the terminal device side.

Figure 7:
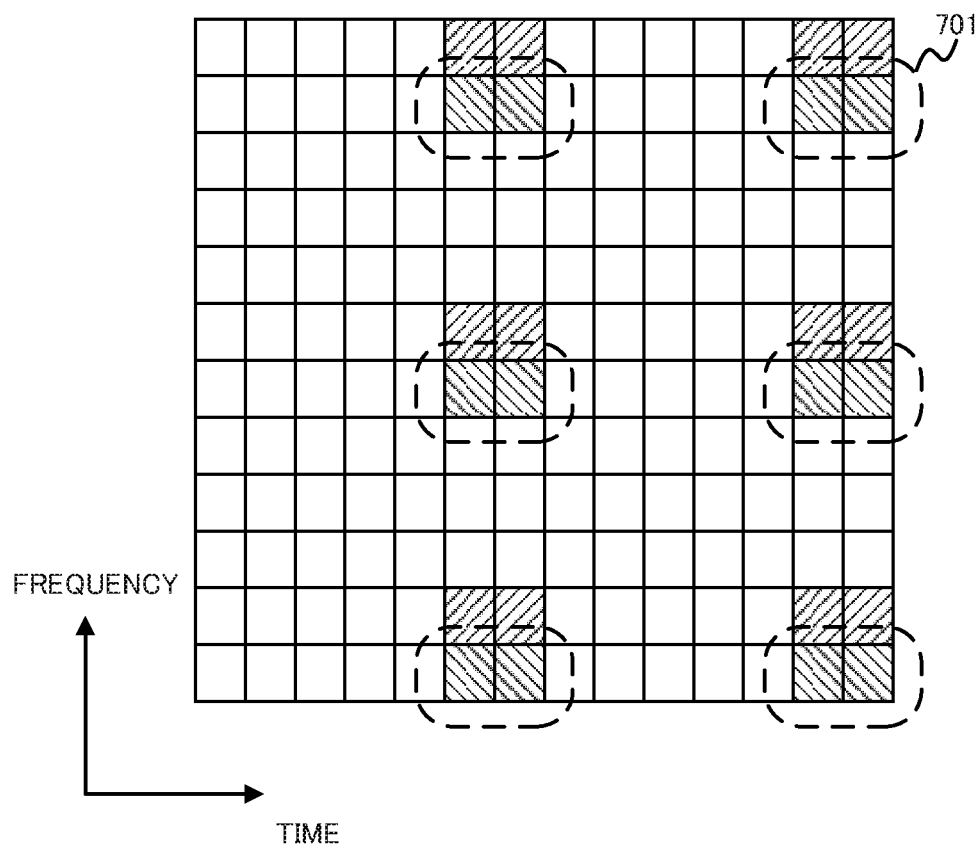
FIG. 7 represents an example of a resource block configuration in the first embodiment.

FIG. 7 represents the RS arrangement when there are three ports (port 7, port 8 and port 9) or four ports (port 7, port 8, port 9 and port 10). The 24 REs identified by the hatched regions (12 diagonally left-down hatched regions and 12 diagonally right-down regions) is the REs in which RS is mapped. When there are three ports, base station 101 maps the sequence for port 9, in addition to port 7 and port 8 shown in FIG. 6, to the 12 REs identified by the diagonally right-down hatched regions. In other words, port 7 (port 8) and port 9 are multiplexed by FDM. When there are four ports, base station 101 maps independent sequences for port 9 and for port 10 to the 12 REs identified by the diagonally right-down hatched regions. Here, independent sequences for port 9 and for port 10 are configured to be multiplexed by CDM with a spreading factor of 2 between two adjacent REs 701 in which RS is mapped, and demultiplexed at the terminal device side. Although the description is based on the case where port 9 and port 10 are used in addition to ports 7 and 8, ports 7 and 8 do not necessarily have to be mapped when only ports 9 and 10 are used.

Figure 8:
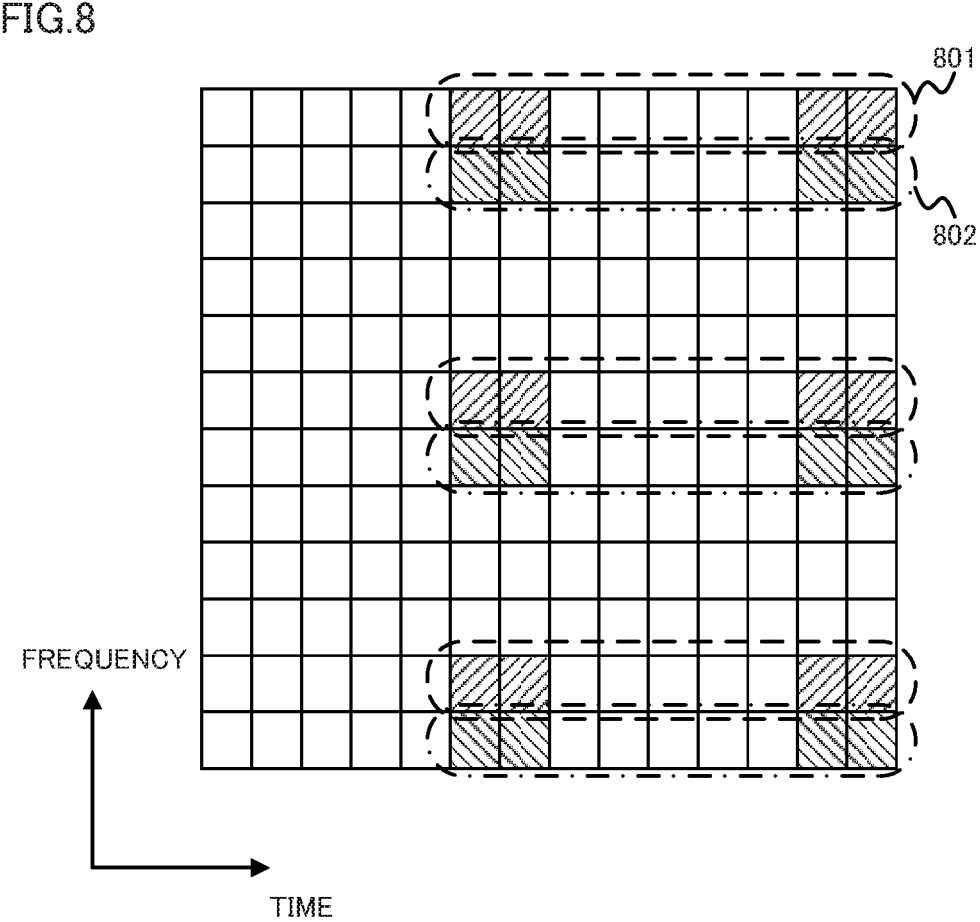
FIG. 8 represents an example of a resource block configuration in the first embodiment.

FIG. 8 represents the RS arrangement when there are eight ports (ports 7-14). The 24 REs identified by the hatched regions (12 diagonally left-down hatched regions and 12 diagonally right-down regions) are the REs in which RS is mapped. Base station 101 maps the independent sequences for port 7 to port 10 to the 12 REs identified by the diagonally left-down hatched regions. Here, the independent sequences for port 7 to port 10 are configured to be multiplexed by 4-spread CDM between 4 REs 801 on the same frequency in which RS is mapped, and demultiplexed at the terminal device side. Base station 101 maps the independent sequences for port 11 to port 14 to the 12 REs identified by the diagonally right-down hatched regions. Here, the independent sequences for port 11 to port 14 are configured to be multiplexed by 4-spread CDM between 4 REs 802 on the same frequency in which RS is mapped, and demultiplexed at the terminal device side. The sequence of each port in FIGS. 6-8 can be obtained by multiplying an orthogonal code sequence and a quasi-orthogonal code sequence.

Base station 101 can carry out signaling (notification of control information) efficiently by (a) setting a lower of the maximum number of ports for MU-MIMO as compared to the maximum number of ports for SU-MIMO, (b) sharing the port used in MU-MIMO with the port used in SU-MIMO, and (c) using common RS mapping or sequence between MU-MIMO and SU-IMO at the shared port. Furthermore, since the format of the control information can be shared, base station 101 can dynamically switch between SU-MIMO and MU-MIMO. Thus, base station 101 can improve the usage efficiency of frequency by adaptive switching.

Specific signaling will be described hereinafter. FIG. 9 represents an example of control information involved in the present embodiment. Base station 101 supporting as many as 8 ports in SU-MIMO notifies each terminal device about control information including the information shown in FIG. 9. Specifically, the control information includes 3 bits for rank information (first identifier, spatial multiplex information) indicating the number of spatial multiplex addressed to that terminal device, and 16 bits of information related to CW1 and CW2 (second identifier, information indicating the parameter related to transmission data), for each terminal device. For each CW. MCSI indicating MCS is represented by 5 bits, NDI indicating whether the transmission is the initial delivery or not is represented by 1 bit, and RV indicating the puncturing pattern is represented by 2 bits. A predetermined combination of MCSI and RV indicates that the relevant CW is non-transmission (not transmitted), As a specific example, non-transmission can be indicated when MCSI is the MCS of the lowest transmission rate and RV indicates puncturing in retransmission.

FIG. 10 represents a correspondence table showing ports corresponding o control information according to the present embodiment. Among the 8 states represented by the 3-bit rank information, state 1 and state 2 both indicate that the rank is rank 2 or lower. For those of state 3 and above among the 8 states, the number of each state corresponds to the rank number.

When the rank information is at state 1 or state 2, base station 101 specifies a port using the state allocated to the information for every CW, in addition to the rank information. When one CW is to be transmitted to an arbitrary terminal device, base station 101 sets the MCSI and RV combination of one CW at "disable" (combination indicating non-transmission) and the MCSI and RV combination of the other CW at "enable" (combination of arbitrary values that are not "disable"). Based on the 1-bit NDI at the CW set at "disable" and whether the rank information is at state 1 or state 2, base station 101 specifies the four ports of port 7-12.

When two CWs are to be transmitted towards an arbitrary terminal device, base station 101 sets the MCSI and RV combination of both CWs at "enable". Base station 101 specifies the combination of port 7 and port 8, or the combination of port 9 and port 10, depending upon whether the rank information is at state 1 or state 2. On part of the terminal device, first the rank information is confirmed. The terminal device confirms the MCSI and RV combination of CW1 and CW2 when the rank information is at state 1 or state 2. When both are "enable", the terminal device obtains the two ports information from the state of the rank information. If the MCSI and RV combination of one CW is "disable", the terminal device confirms the NDI and SCID of the CW corresponding to "disable", and obtains one port information. Although FIG. 3 shows the case where CW1 is used in transmitting one CW towards one terminal device, the MCSI and RV combination and the NDI of CW1 are to be replaced with those of CW2 when CW2 is to be used. State 1 and state 2 can be shared between SU-MIMO and MU-MIMO.

When the rank information is at state 3 to state 8, base station 101 specifies the port combination using each state. By setting the highest multiplex value of the data addressed to one terminal device at 2 in MU-MIMO, it can be implicitly stated that state 3 to state 8 are SU-MIMO. Furthermore, by fixedly setting the employed port for each rank of SU-MIMO by base station 101, the rank information state and port combination can be set in one-to-one correspondence. Thus, base station 101 can suppress the number of bits required for the control information.

For example, for a terminal device transmitting one CW using port 7 such as terminal device 102 in FIG. 1 and terminal device 202 in FIG. 2, base station 101 sets the rank information in the control information at 1, sets "enable" for the MCSI and RV combination of CW1, and "disable" for the MCSI and RV combination of CW2, and the NDI of CW2 at 0. For a terminal device transmitting two CWs using port 9 and port 10 such as terminal device 204 in FIG. 2, base station 101 sets the rank information in the control information at 2, the MCSI and RV combination of CW1 at "enable", and the MCSI and RV combination of CW2 at "enable". For a terminal device transmitting two CWs using port 7 to port 9 such as terminal device 302 in FIG. 3, base station 101 sets the rank information in the control information at 3. For a terminal device transmitting two CWs using ports 7 to port 14 such as terminal device 402 in FIG. 4, base station 101 sets the rank information in the control information at 8. Thus, by having base station 101 and the terminal devices maintain a common table in advance, and notifying the control information from base station 101, the terminal device can share information of ports used for transmitting a CW addressed to itself (port information).

In the control information format of a communication system according to the present embodiment (downlink control information (DCI) format), base station 101 can specify the port by a combination of information indicating the rank (the number of spatial multiplex) and the parameter for every CW (transmission parameter). In other words, by taking advantage that the highest multiplex value of MU-MIMO is less than that of SU-MIMO and restricting the port combination, base station 101 can specify a port efficiently. Furthermore, by sharing the control information format between SU-MIMO and MU-MIMO, base station 101 and the terminal device can carry out processing efficiently.

Particularly for a system that identifies control information of a plurality of different formats by blind decoding, the circuit complexity of the terminal device can be reduced since the types of formats for blind decoding can be reduced. Furthermore, since the relevant system can reduce the number of times of blind decoding, the processing of the terminal device can be reduced.

Thus, base station 101 multiplexes N (N is a natural number of 2 and above) reference signals orthogonal to each other for transmission, and transmits control information including information (first identifier) identifying the rank of a transmission signal addressed to a certain terminal device that is the communication destination and information (second identifier) identifying the transmission parameter of a transmission signal. The terminal device obtains a reference signal using information identifying the rank and information identifying the transmission parameter of a transmission signal. Accordingly, base station 101 can specify a port with efficient signaling. Thus, base station 101 and the terminal device can carry out effective transmission.

[Second Embodiment]

A second embodiment of the present invention will be described hereinafter with reference to the drawings. The present embodiment corresponds to the case of carrying out MU-MIMO using a sequence (quasi-orthogonal sequence, scramble sequence), in addition to the port. Although the description is based on the case of using a quasi-orthogonal sequence as the sequence, a similar effect can be achieved by carrying out processing similar to that set forth above even for a scramble sequence.

A CW addressed to a terminal device of which the rank is less than or equal to 2 is transmitted using port 7 or port 8. The base station multiplexes a CW addressed to two terminal devices at most at port 7 or port 8. The base station transmits the transmission signal addressed to each terminal device in independent directivity patterns. At this stage, the base station multiplies RS by the sequence differing between the terminal devices. Accordingly, RS can readily be demultiplexed at the terminal device side.

The control information according to the present embodiment can be realized using information similar to the control information shown in FIG. 9. FIG. 11 represents an example of ports and sequences corresponding to the control information according to the present embodiment. Among the 8 states represented by the 3-bit rank information, state 1 and state 2 both indicate that the rank is rank 2 or lower. For those of state 3 and above among the 8 states, the number of each state corresponds to the rank number.

When the rank information is at state 1 or state 2, the base station specifies a port using the state allocated to the information for every CW, in addition to the rank information. When one CW is to be transmitted to an arbitrary terminal device, the sets the MCSI and RV combination of one CW at "disable" (combination indicating non-transmission) and the MCSI and RV combination of the other CW at "enable" (combination of arbitrary values that are not "disable"). Based on the 1-bit NDI at the CW set at "disable" and whether the rank information is at state 1 or state 2, the base station specifies the two ports of port 7 and 8.

When two CWs are to be transmitted towards an arbitrary terminal device, the base station sets the MCSI and RV combination of both CWs at "enable". The base station specifies the combination of port 7 and port 8, or the combination of port 9 and port 10, depending upon whether the rank information is at state 1 or state 2. Furthermore, base station 101 specifies a sequence by state 1 indicating sequence 1 and by state 2 indicating sequence 2. On part of the terminal device, first the rank information is confirmed. The terminal device obtains the sequence corresponding to the state and further confirms the MCSI and RV combination of CW1 and CW2 when the rank information is at state 1 or state 2. When both are "enable", the terminal device obtains the two ports information from the state of the rank information. If the MCSI and RV combination of one CW is "disable", the terminal device confirms the NDI and SCID of the CW corresponding to "disable", and obtains one port information. Although FIG. 3 shows the case where CW1 is used in transmitting one CW towards one terminal device, the MCSI and RV combination and the NDI of CW1 are to be replaced with those of CW2 when CW2 is to be used. State 1 and state 2 can be shared between SU-MIMO and MU-MIMO.

When the rank information is at state 3 to state 8, the base station specifies the port combination using each state. By fixedly setting the employed port for each rank of SU-MIMO by the base station, the rank information state and port combination can be set in one-to-one correspondence. Thus, the base station can suppress the number of bits required for the control information.

Thus, in a communication system in which abuse station and terminal device carry out communication by SU-MIMO or MU-MIMO, the base station multiplies N reference signals orthogonal to each other or quasi-orthogonal to each other by a quasi-orthogonal sequence for transmission, and transmits control information including information (first identifier) identifying the rank of a transmission signal addressed to a certain terminal device that is the communication destination and information (second identifier) identifying the transmission parameter of a transmission signal. The terminal device identifies whether the reference signal is orthogonal or quasi-orthogonal from the information identifying the rank. When the reference signals are quasi-orthogonal, the terminal device uses the information identifying the rank and the information identifying the transmission parameter of the transmission signal to obtain the reference signal and the quasi-orthogonal sequence. When the reference signals are orthogonal, the terminal device obtains the reference signal using the information identifying the rank. Accordingly, the base station can specify a port and a quasi-orthogonal sequence with efficient signaling. Thus, the base station and terminal device can carry out communication efficiently.

[Third Embodiment]

A third embodiment of the present invention will be described hereinafter with reference to the drawings. The first embodiment was described based on a communication system with a base station supporting 8 ports at most. The present embodiment is directed to a communication system having a base station supporting 4 ports at most.

FIG. 12 represents an example of control information according to the present embodiment. The base station supporting 4 ports at most in SU-MIMO notifies each terminal device about control information including information indicated in FIG. 12. Specifically, the control information includes, for each terminal device, 2 bits of rank information (first identifier) that is the information indicating the number of spatial multiplex addressed to that terminal device, and 16 bits of information (second identifier) related to CW1 and CW2.

FIG. 13 shows an example of a correspondence table representing of control information and ports according to the present embodiment. Specifically, FIG. 13 represents an example of control information used at the system carrying out MU-MIMO using ports 7 and 10 that are ports orthogonal to each other. Among the four states represented by two bits of rank information, state 1 and state 2 both indicate that the rank is rank 2 or lower. For those of state 3 and above among the 8 states, the number of each state corresponds to the rank number. For the corresponding relationship between rank information, information related to CW1. and CW2, and the port to be allocated (one or more of ports 7-10), the correspondence similar to that of the first embodiment may be employed.

FIG. 14 represents another example indicating ports corresponding to control information according to the present embodiment. FIG. 14 represents an example of control information used at the system carrying out MU-MIMO using ports 7 to 8 that are ports orthogonal to each other and two types of quasi-orthogonal sequences. Among the four states represented by two bits of rank information, state 1 and state 2 both indicate that the rank is rank 2 or lower. For those of state 3 and above among the 4 states, the number of each state corresponds to the rank number. For the corresponding relationship between rank information, information related to CW1 and CW2, and the port to be allocated (one or more of ports 7-10), the correspondence similar to that of the first embodiment may be employed.

By the base station combining information representing the rank and information representing the parameter for every CW in the control information format of the communication system according to the present embodiment, a port can be specified. In other words, by taking advantage that the highest multiplex value of MU-MIMO is less than that of SU-MIMO and restricting the port combination, the base station can specify a port efficiently. Furthermore, by sharing the control information format between SU-MIMO and MU-MIMO, the base station can carry out processing efficiently.

[Fourth Embodiment]

A fourth embodiment of the present invention will be described hereinafter with reference to the drawings. in the present embodiment, the base station and terminal device according to the first to third embodiments set forth above will be described from the standpoint of device configuration.

Figure 15:
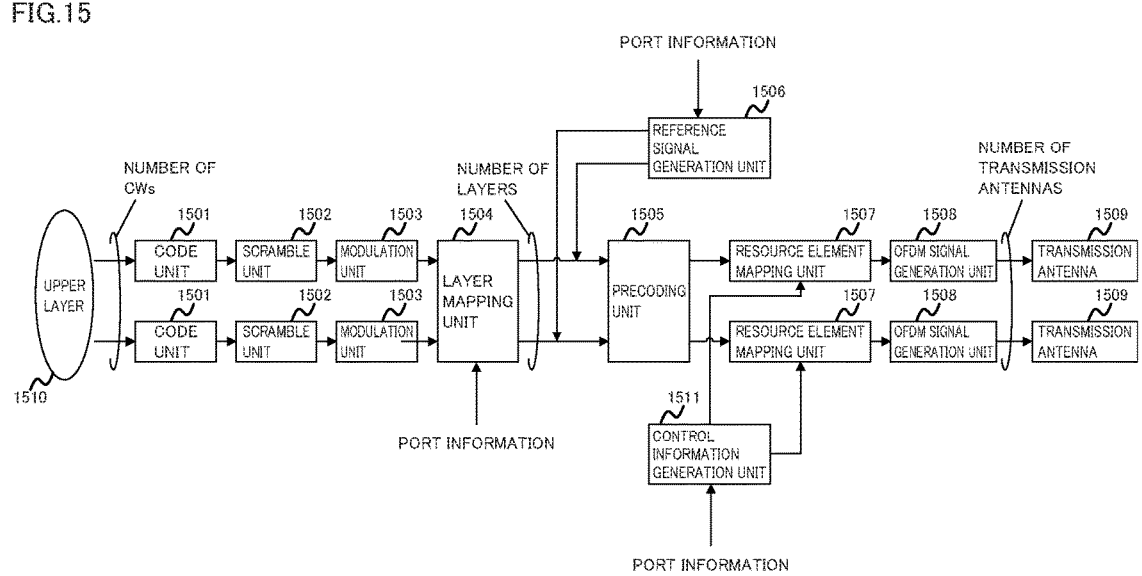
FIG. 15 schematically represents an example of a configuration of a base station (transmission device) according to the second embodiment of the present invention.

FIG. 15 schematically represents an example of a configuration of a base station (transmission device) according to the present embodiment, A coding unit 1501 applies rate mapping to each information data (bit sequence) for every CW sent from an upper layer 1510. A scrambling unit 1502 multiplies each information data subjected to error correcting coding and rate mapping by a scrambling code. A modulation unit 1503 applies modulation processing such as PSK modulation, or QAM modulation to each transmission data multiplied by a scrambling code. A layer mapping unit 1504 refers to port information to distribute a modulation symbol sequence output from modulation unit 1503 for every layer. Each layer in SU-MIMO and MU-MIMO corresponds to each port. A reference signal generation unit 1506 refers to the port information to generate a reference signal sequence for every port. A precoding unit 1505 applies precoding processing to the modulation symbol sequence for every layer and precoding to the reference signal sequence for every port generated at reference signal generation unit 1506, Accordingly, precoding unit 1505 generates RS. More specifically, precoding unit 1505 multiplies the modulation symbol sequence or reference signal by a precoding sequence.

A control information generation unit 1511 uses the port information to generate control information (downlink control information) described in the first to third embodiments. A resource element mapping unit 1507 maps the modulation symbol sequence precoded at precoding unit 1505, RS, and control information generated at control information generation unit 1511 to a predetermined resource element. When a RS is to be mapped, resource element mapping unit 1507 can apply the multiplexing method indicated in FIGS. 6-8 such that the RS for each port is orthogonal to each other.

An OFDM signal generation unit 1508 converts the resource block group output from resource element mapping unit 1507 into an OFDM signal. OFDM signal generation unit 1508 transmits the OFDM signal obtained by conversion from transmission antenna 1509 as a downlink transmission signal.

Figure 16:
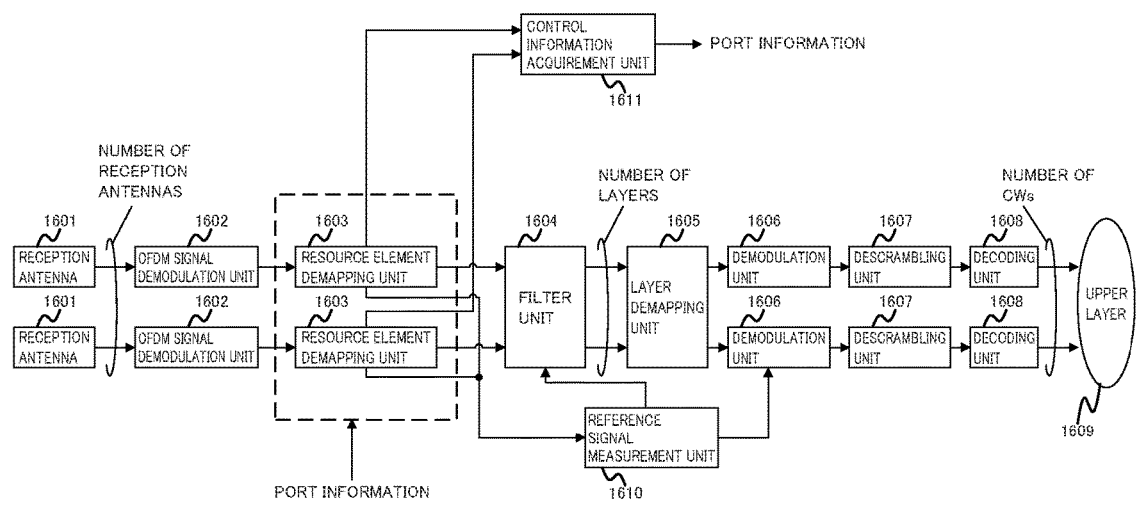
FIG. 16 schematically represents an example of a configuration of a terminal device (reception device) according to the second embodiment.
Figure 17:
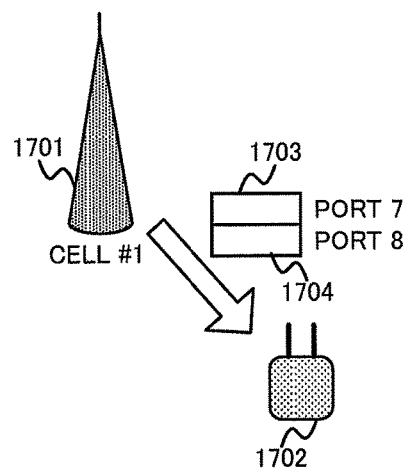
FIG. 17 represents a configuration of a communication system carrying out SU-MIMO communication.
Figure 18:
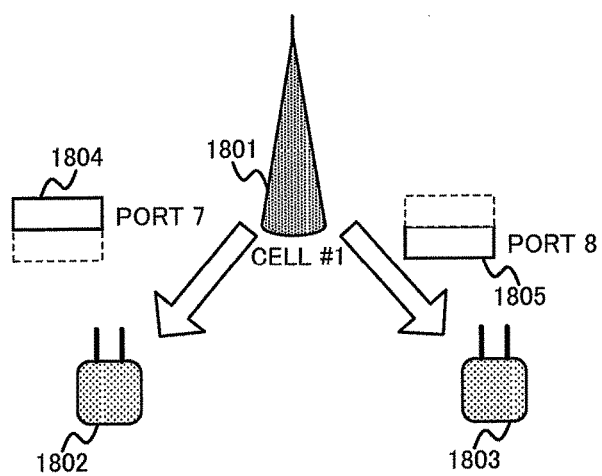
FIG. 18 represents a configuration of a communication system carrying out MU-MIMO communication.

FIG. 16 schematically represents an example of a configuration of a terminal device (reception device) according to the present embodiment. An OFDM signal demodulation unit 1602 applies OFDM demodulation processing to a downlink reception signal received at reception antenna 1601 to output a resource block group.

A resource element dernapping unit 1603 demaps the control information. A control information acquirement unit 1611 obtains port information from the control information. The obtained port information is set in the terminal device. For obtaining port information from the control information, the method described in the first to third embodiments is used. Then, resource element demapping unit 1603 refers to the port information to obtain RS from the resource element located at a predetermined position, and outputs the obtained RS to reference signal measurement unit 1610. Resource element demapping unit 1603 outputs any reception signal at a resource element other than the resource element having RS mapped to a filter unit 1604. Resource element dernapping unit 1603 carries out processing corresponding to that carried out at resource element mapping unit 1507 in obtaining RS. More specifically, when TDM, FDM, CDM, or the like are applied such that the RS is orthogonal to each other for every port at resource element mapping unit 1507, resource element demapping unit 1603 carries out demapping or inverse diffusion corresponding to the application.

Reference signal measurement unit 1610 measures the channel for each port by multiplying the RS for each port output from resource element demapping unit 1603 by a sequence corresponding to the reference signal sequence for every port generated at reference signal generation unit 1506 (the complex conjugate sequence of the reference signal sequence). Since RS is precoded in the transmission device, reference signal measurement unit 1610 will measure an equivalent channel including precoding in addition to the channel between the transmission antenna and reception antenna.

Filter unit 1604 subjects the reception signal output from resource element demapping unit 1603 to filtering. A filter unit 1604 further applies the precoding corresponding to the precoding at precoding unit 1505 to output a signal for every layer to a layer demapping unit 1605. Layer demapping unit 1605 applies a conjugation process corresponding to layer mapping unit 1504 to convert the signal for every layer into a signal for every CW. A demodulation unit 1606 applies demodulation processing corresponding to the modulation processing at modulation unit 1503 to the converted signal for every CW. A descrambling unit 1607 multiples the signal for every CW subjected to demodulation processing by a complex conjugate of the scrambling code used at scrambling unit 1502 (divide by the scrambling code). Then, decoding unit 1608 applies rate demapping and error correction decoding to the signal for every CW having a complex conjugate multiplied to obtain information data for every CW. Decoding unit 1608 transmits the Obtained information data for every CW to upper layer 1609.

Filter unit 1604 applies, as filtering processing, zero forcing (ZF), minimum mean square error (MMSE), maximum likelihood detection (MID) or the like to the reception signal for every reception antenna 1601 to detect a transmission signal for each layer (port) of FIG. 15.

Although the description is based on the case where MU-MIMO is carried out using only orthogonal ports, transmission and reception processing can be carried out by a similar configuration for MU-MIMO using a quasi-orthogonal sequence, In this case, quasi-orthogonal sequence information is included in the port information. Reference signal generation unit 1506 multiplies in advance the quasi-orthogonal sequence by a reference signal sequence, and resource element demapping unit 1603 demaps the RS from the resource element, and descrambling, unit 1607 carries out the processing of multiplying the complex conjugate of the quasi-orthogonal system subsequent to the demapping.

At a communication system including a transmission device and the reception device, the transmission device can specify a port by combining information indicating the rank (multiplex value) with information indicating the parameter for every CW (transmission parameter). By transmitting control information including information indicating the rank and information indicating the parameter for every CW from the transmission device to the reception device, information related to the reference signal can be shared between the transmitter device and reception device. In other words, the transmission device can specify a port corresponding to a reference signal efficiently by taking advantage that the highest multiplex value of MU-MIMO is less than that of SU-MIMO, and limiting the combination of a port corresponding to a reference signal.

In the case where MU-MIMO is carried out using a quasi-orthogonal sequence, the terminal device may have compatibility with a conventional communication system that multiplexes a reference signal multiplied by two types of quasi-orthogonal codes via two orthogonal first ports for transmission.

Each of the embodiments is described based on, but not limited to using a resource element and resource block as the mapping unit of transmission data and RS, and using a subframe and radio frame as the transmission unit in the time direction. A similar effect can be achieved by using a region constituted of an arbitrary frequency and time, and the time unit instead.

Each embodiment has been described based on, but not limited to the case where SU-MIMO and MU-MIMO are supported. For example, in a communication system supporting only SU-MIMO, the base station can specify a port corresponding to a reference signal of favorable performance at a low rank by virtue of the signaling described in each of the embodiments set forth above. Therefore, effective communication can be carried out by the relevant configuration.

Each embodiment has been described based on, but not limited to the case where demodulation is carried out using a RS subjected to precoding, and using a port equivalent to the layer of MIMO as the port corresponding to the RS subjected to precoding. A similar effect can he achieved by applying the present invention to a port corresponding to reference signals differing from each other. For example, an unprecoded RS instead of a precoded RS can be used, and a port equivalent to the output end subsequent to precoding or a port equivalent to a physical antenna (or a combination of physical antenna) can be used.

The program operated at a mobile station device and base station according to the present invention is a program controlling a CPU or the like (a program for operating a computer) so as to realize the function of the embodiments set forth above involved in the present invention. The information handled at these devices are temporarily stored in a RAM during processing, and then stored in various ROM or HDD to be read out by the CPU, as necessary, for correction and writing. The storage medium for storing the program may be any of a semiconductor medium (for example, ROM, non-volatile memory card), an optical recording medium (for example, DVD, MO, MD, CD, BD), a magnetic recording medium (for example, magnetic tape, flexible disc) or the like. In addition to realizing the functions of the embodiment set forth above by executing a loaded program, the functions of the present invention may be realized by a process according to an operating system or another application program or the like, based on the commands of that program.

Further, the recording medium is anon-transitory medium storing the relevant program in a computer-readable manner. As used herein, a program includes, not only a program that can be executed directly by a CPU, but a program of a source program format, a program subjected to compression, encrypted program, and the like.

When distributing to be available on the market, the program can be stored in a portable recording medium for distribution, or may be transferred to a server computer connected via a network such as the Internet. In this case, the storage device of the server computer is included in the present invention.

The mobile station device and base station in the embodiment set forth above may be partially or completely realized as an LSI that is typically an integrated circuit. The mobile station device and each function block of the base station may be provided individually in chips, or these functions may be integrated partially or entirely in a chip. The means for an integrated circuit is not limited LSI, and may be realized by a dedicated circuit, or a general-purpose processor. When development in the semiconductor art sees the approach of achieving an integrated circuit replacing an LSI, an integrated circuit by such approach may be employed.

<Appendix>

(1) An aspect of the present invention is directed to a transmission device transmitting at least one transmission data using spatial multiplex transmission. The transmission device includes a control information generation unit (1511) generating, based on a reference signal transmitted together with said transmission data, control information including spatial multiplex information indicating the number of transmission data spatially multiplexed and information indicating a parameter related to said transmission data, and a transmission unit (1508, 1509) transmitting said reference signal and said control information.

(2) Preferably, the information indicating a parameter related to said transmission data is control information indicating the modulation scheme and code rate for said transmission data, control information indicating a puncturing pattern for said transmission data, and information indicating whether the transmission of said transmission data is the initial delivery or not.

(3) Preferably, said transmission data is downlink transmission data. Said reference signal is a signal for demodulating a physical downlink shared channel in which said downlink transmission data is mapped.

(4) Another aspect of the present invention is directed to a reception device receiving at least one transmission data using spatial multiplex transmission. The reception device includes a reception unit (1601, 1602) receiving control information including spatial multiplex information indicating the number of transmission data spatially multiplexed and information indicating a parameter related to said transmission data, and a reference signal, and an identification unit (1603) identifying said reference signal using said control information.

(5) Preferably, said transmission data is downlink transmission data. Said reception device further includes a demodulation unit (1606) demodulating a physical downlink shared channel in which said downlink transmission data is mapped using said identified reference signal.

(6) Still another aspect of the present invention is directed to a communication system in which at least one transmission data is transmitted from a transmission device to a reception device using spatial multiplex transmission. Said transmission device transmits control information including spatial multiplex information indicating the number of transmission data spatially multiplexed and information indicating a parameter related to said transmission data, and a reference signal. Said reception device identifies said reference signal using said control information.

(7) A still further aspect of the present invention is directed to a communication method at a transmission device transmitting at least one transmission data using spatial multiplex transmission. The communication method includes the steps of: said transmission device generating, based on a reference signal transmitted together with said transmission data, control information including spatial multiplex information indicating the number of transmission data spatially multiplexed and information indicating a parameter related to said transmission data, and said transmission device transmitting said reference signal and said control information.

(8) A still further aspect of the present invention is directed to a communication method at a reception device receiving at least one transmission data transmitted using spatial multiplex transmission. The communication method includes the steps of: said reception device receiving control information including spatial multiplex information indicating the number of transmission data spatially multiplexed and information indicating a parameter related to said transmission data, and a reference signal, and said reception device identifying said reference signal using said control information.

Although the embodiments of the present invention has been described in detail with reference to the drawings, it is to be understood that the specific configuration is not limited by embodiments disclosed, and is intended to include any design or the like within the scope and meaning equivalent to the terms of the claims in the present invention.

INDUSTRIAL APPLICABILITY

The present invention is suitable used in a radio transmission device, a radio reception device, and a radio communication system and radio communication method.

REFERENCE SIGNS LIST

101 base station; 102-105, 202-204, 302, 402 terminal device; 106-109, 205-208, 303, 304, 403, 404 code word; 601, 701, 801, 802 resource element; 1501 coding unit; 1502 scrambling unit; 1503 modulation unit; 1504 layer mapping unit; 1505 precoding unit; 1506 reference signal generation unit; 1507 resource element mapping unit; 1508 OFDM signal generation unit; 1509 transmission antenna; 1510 upper layer; 1511 control information generation unit; 1601 reception antenna; 1602 OFDM signal demodulation unit; 1603 resource element demapping unit; 1604 filter unit; 1605 layer demapping unit; 1606 demodulation unit; 1607 descrambling unit; 1608 decoding unit; 1609 upper layer; 1610 reference signal measurement unit; 1611 control information acquirement unit; 1701, 1801, 1901 base station; 1702, 1802, 1803, 1902, 1903 terminal device; 1703, 1804, 1805, 1904, 1905 code word; 1906, 1907 directivity pattern.

The invention claimed is:

1. A base station device configured to communicate with a terminal device, the base station device comprising:
   control information generation circuitry configured to generate control information including 3-bit information, the 3-bit information indicating at least one port, one or less scrambling identity and a number of layers, and
   transmission circuitry configured to transmit to the terminal device a physical downlink shared channel, a reference signal for demodulation of the physical downlink shared channel, and the control information,
   wherein, in a case that two codewords are mapped to the physical downlink shared channel,
   among a first value to an eighth value indicated by the 3-bit information, the third value to the eighth value indicate that the number of layers is from 3 to 8 respectively, and the first value and the second value indicate that the number of layers is equal to 2, and
   the first value indicates that the scrambling identity for the reference signal is equal to 0 and the second value indicates that the scrambling identity is equal to 1.

2. A terminal device configured to communicate with a base station device, said terminal device comprising:
   reception circuitry configured to receive from the base station device a physical downlink shared channel, a reference signal for demodulation of the physical downlink shared channel, and a control information which includes 3-bit information, the 3-bit information indicating at least one port, one or less scrambling identity and a number of layers,
   wherein, in a case that two codewords are mapped to the physical downlink shared channel,
   among a first value to an eighth value indicated by the 3-bit information, the third value to the eighth value indicate that the number of layers is from 3 to 8 respectively, and the first value and the second value indicate that the number of layers is equal to 2, and
   the first value indicates that the scrambling identity for the reference signal is equal to 0 and the second value indicates that the scrambling identity is equal to 1.

3. A method used at a base station device which is configured to communicate with a terminal device, the method comprising:
   generating, by control information generation circuitry, control information including 3-bit information, the 3-bit information indicating at least one port, one or less scrambling identity and a number of layers, and
   transmitting, by transmit circuitry, a physical downlink shared channel, a reference signal for demodulation of the physical downlink shared channel, and the control information,
   wherein, in a case that two codewords are mapped to the physical downlink shared channel,
   among a first value to an eighth value indicated by the 3-bit information, the third value to the eighth value indicate that the number of layers is from 3 to 8 respectively, and the first value and the second value indicate that the number of layers is equal to 2, and
   the first value indicates that the scrambling identity for the reference signal is equal to 0 and the second value indicates that the scrambling identity is equal to 1.

4. A method used at a terminal device which is configured to communicate with a base station device, the method comprising:
   receiving, by reception circuitry, a physical downlink shared channel, a reference signal for demodulation of the physical downlink shared channel, and a control information including 3-bit information, the 3-bit information indicating at least one port, one or less scrambling identity and a number of layers,
   wherein, in a case that two codewords are mapped to the physical downlink shared channel,
   among a first value to an eighth value indicated by the 3-bit information, the third value to the eighth value indicate that the number of layers is from 3 to 8 respectively, and the first value and the second value indicate that the number of layers is equal to 2, and
   the first value indicates that the scrambling identity for the reference signal is equal to 0 and the second value indicates that the scrambling identity is equal to 1.

* * * * *